(12) United States Patent
Elford

(10) Patent No.: US 9,676,019 B2
(45) Date of Patent: Jun. 13, 2017

(54) DETERMINING PART ORIENTATION FOR INCREMENTAL SHEET FORMING

(71) Applicant: The Boeing Company, Chicago, IL (US)

(72) Inventor: Michael C. Elford, Brisbane (AU)

(73) Assignee: The Boeing Company, Chicago, IL (US)

( * ) Notice: Subject to any disclaimer, the term of this patent is extended or adjusted under 35 U.S.C. 154(b) by 1036 days.

(21) Appl. No.: 13/916,776

(22) Filed: Jun. 13, 2013

(65) Prior Publication Data

US 2016/0067906 A1 Mar. 10, 2016

(51) Int. Cl.
| | | |
|---|---|---|
| *G06F 19/00* | (2011.01) | |
| *B21D 22/20* | (2006.01) | |
| *B21D 31/00* | (2006.01) | |
| *B21D 31/06* | (2006.01) | |
| *B29C 51/46* | (2006.01) | |
| *G06T 19/00* | (2011.01) | |
| *B29C 51/30* | (2006.01) | |

(52) U.S. Cl.
CPC ........... *B21D 22/20* (2013.01); *B21D 31/005* (2013.01); *B21D 31/06* (2013.01); *B29C 51/30* (2013.01); *B29C 51/46* (2013.01); *G06T 19/00* (2013.01)

(58) Field of Classification Search
CPC ............. G06F 17/5018; G06F 2217/42; G06F 17/5095; G06F 17/50; G06F 17/5009; G06F 17/5086; G06F 2217/16; G06F 3/0412; B21D 31/005; B21D 22/20; B21D 22/201; B21D 35/001; B21D 35/006; B21D 39/026; G05B 2219/35005; G05B 19/4093; G05B 19/4097; G05B 2219/35017; C21D 9/48

See application file for complete search history.

(56) References Cited

U.S. PATENT DOCUMENTS

| | | | |
|---|---|---|---|
| 6,216,508 B1 | 4/2001 | Matsubara et al. | |
| 6,678,568 B1 * | 1/2004 | Yamada | ................. G06T 17/00 700/145 |
| 7,403,833 B2 * | 7/2008 | Heide | ..................... G06F 17/50 700/119 |
| 2003/0125825 A1 * | 7/2003 | Liu | .................... G05B 19/4097 700/97 |

(Continued)

OTHER PUBLICATIONS

Silva et al., Theory of single point incremental forming, CIPR annals—Manufacturing Technology 57 (2008) 247-252.*

(Continued)

*Primary Examiner* — Darrin Dunn
(74) *Attorney, Agent, or Firm* — Kwan & Olynick LLP

(57) ABSTRACT

Provided are methods and systems of orienting parts for incremental sheet forming and, in some examples, forming the parts in these orientations. A forming orientation may be identified by simulating forming operations of the same part in multiple different orientations and identifying the thinnest portions of the part for each of the orientations. The orientation with the maximum thickness of these identified portions is selected as a forming orientation. The forming simulation may be based on the Sine law by comparing the actual and projected areas of different surface elements of the shape to be formed. As such, a part formed in the forming orientation will have the greatest minimum thickness among all other possible orientations.

20 Claims, 10 Drawing Sheets

(56) References Cited

U.S. PATENT DOCUMENTS

| | | | | |
|---|---|---|---|---|
| 2006/0089823 | A1* | 4/2006 | Meyer | G06F 17/5018 703/2 |
| 2010/0051167 | A1* | 3/2010 | Hunter | B29C 70/00 156/64 |
| 2010/0257910 | A1* | 10/2010 | Castle | B21D 22/02 72/57 |
| 2011/0087463 | A1* | 4/2011 | Nakhle | G06F 17/5095 703/1 |
| 2011/0238384 | A1* | 9/2011 | Michal | G06F 17/5018 703/1 |
| 2012/0316666 | A1* | 12/2012 | Boyl-Davis | G05B 19/40931 700/98 |
| 2013/0231898 | A1* | 9/2013 | Oliverius | G06F 17/5018 703/1 |
| 2014/0042683 | A1* | 2/2014 | Kiridena | B21D 31/005 269/287 |
| 2015/0034235 | A1* | 2/2015 | Huskamp | B21D 22/18 156/196 |
| 2015/0112468 | A1* | 4/2015 | Rudnick, III | G05B 19/41865 700/98 |
| 2015/0196950 | A1* | 7/2015 | Saito | B21J 5/06 428/600 |

OTHER PUBLICATIONS

Hirt et al., Investigation into a new hybrid forming process: Incremental sheet forming combined with stretch forming, CIPR annals—Manufacturing Technology 58 (2008) 225-228.*

Jeswiet, Asymmetric Incremental Sheet Forming, Advanced Materials Research, vols. 6-8, pp. 35-38, 2005.*

Avitzur, B., et al., "Analysis of Power Spinning of Cones", Journal of Engineering for Industry, Aug. 1960, pp. 231-244.

Bambach, M., "A Geometrical Model of the Kinematics of Incremental Sheet Forming for the Prediction of Membrane Strains and Sheet Thickness", Journal of Materials Processing Technology, vol. 210, 2010, pp. 1562-1573.

Jackson, Kathryn, et al., "The Mechanics of Incremental Sheet Forming", Journal of Materials Processing Technology, vol. 209, 2009, pp. 1158-1174.

* cited by examiner

DETERMINING PART ORIENTATION FOR INCREMENTAL SHEET FORMING

BACKGROUND

Forming is a process of configuring a part, such as a sheet, through mechanical deformation. During forming, the part is reshaped without adding or removing material. Forming is believed to follow the plastic deformation principle, where the physical shape of a part is permanently deformed. Die forming is a popular technique, in which a sheet is compressed between female and male dies having matching shapes. Other known forming techniques include rubber pad forming, hydroforming, fluid forming, blow forming, and multi-point contact forming. However, these forming techniques have drawbacks limiting their applications. For example, the die forming technique requires precision dies, which are expensive to fabricate and, accordingly, may not be feasible for small runs and/or large parts.

Incremental sheet forming is a flexible process that allows forming, from a blank sheet, parts having many different shapes without extensive preparation and sometimes without part-specific tools. The shape of a part formed using this technique depends on the path of a stylus. For any given shape, many different paths can be employed, each producing different results in the final part, such as different thickness profiles. Many failure modes are possible, such as buckling and tearing of the sheet during forming. Developing a correct forming path is essential to achieve desired parameters, such as a minimum wall thickness.

One characteristic of the forming path in the incremental sheet forming process is the orientation of the formed part relative to the plane of the blank sheet and/or relative to the direction of the stylus. Typically, the plane of the blank sheet is normal to the direction of the stylus and either the plane or the direction of the stylus may be used as a reference. The above-mentioned orientation of the formed part effects how much each portion of the blank sheet is thinned and can be controlled to achieve various thinning criteria, while avoiding the above-referenced failure modes. Conventionally, the orientation of a part is chosen manually by an operator wishing to form the part. The operator draws upon his or her past experience to help guide this orientation process. In some cases, such as for simple symmetrical shapes, the orientation of the formed part may be apparent. However, complex shapes may need to be formed in rather unusual orientations to ensure adequate thicknesses in all portions of the formed part, and these orientations cannot be manually determined with sufficient precision. As a result, complex shapes are frequently formed in suboptimal orientations, resulting in undesirable thickness profiles.

SUMMARY

Accordingly, a need exists for methods and systems for precisely orienting parts for incremental sheet forming to achieve criteria, such as maximizing the thickness of the thinnest portion of the part.

Provided is an illustrative method of orienting a part relative to a virtual plane parallel to a blank sheet. The part is to be formed from the blank sheet using incremental sheet forming using a stylus perpendicular to the virtual plane. The method involves characterizing the shape of the part to be formed from a blank sheet and identifying a forming orientation of the part. The forming orientation is one of multiple orientations that may be evaluated during this method. When the part is in the forming orientation, the thickness of the thinnest portion of the part is at the maximum compared to the thickness of the thinnest portion of the part when the part is formed in any of the plurality of orientations other than the forming orientation. Other criteria for identifying the forming orientation may be used as well.

Identifying the forming orientation may involve a number of operations, such as approximating the shape with surface elements, calculating the actual area of each of the surface elements, calculating the projected area of each of the surface elements for the current orientation, and identifying, among all surface elements, a specific surface element that has the smallest ratio of the projected area to the actual area. The shape approximated with the surface elements is in one of the plurality of orientations relative to the virtual plane. The process of identifying the forming orientation may also involve reorienting the shape approximated with the surface elements relative to the virtual plane into another orientation of a plurality of orientations. The process continues with repeating calculations for the projected areas and identification of the surface element having the smallest ratio of the projected area to the actual area for this new orientation. Each of the plurality of orientations may be evaluated in such a way by repeating these operations. The process of identifying the forming orientation also involves selecting, from the plurality of orientations, the forming orientation, in which the specific surface element associated with the specific orientation has the highest value of the smallest ratio of the projected area to the actual area of any other specific surface element associated with any other orientation of the plurality of orientations.

Provided also is a vehicle, such as an aircraft, having a part. The part may be formed by characterizing a shape of the part to be formed from a blank sheet that is parallel to a virtual plane and identifying, relative to the virtual plane, a forming orientation of the part from multiple orientations. The thickness of the thinnest portion of the part is at a maximum when the part is in the forming orientation compared to the thickness of the thinnest portion of the part when the part is formed in any of the plurality of orientations other than the forming orientation. The part is then formed in this forming orientation.

Provided also is a part formed by characterizing a shape of the part to be formed from a blank sheet that is parallel to a virtual plane and identifying, relative to the virtual plane, a forming orientation of the part from multiple orientations. The thickness of the thinnest portion of the part is at a maximum when the part is in the forming orientation compared to the thickness of the thinnest portion of the part when the part is formed in any of the plurality of orientations other than the forming orientation. The part is then formed in this forming orientation. The part may be used on an aircraft or other kinds of vehicles.

Provided also is a computer system for orienting a part relative to a virtual plane parallel to a blank sheet, the part to be formed from the blank sheet by incremental sheet forming using a stylus perpendicular to the virtual plane. The computer system includes a memory configured to store a characterization of a shape of the part to be formed from a blank sheet that is parallel to a virtual plane. The computer system also includes a processor configured to identify, relative to the virtual plane, a forming orientation of the part from multiple orientations. The thickness of the thinnest portion of the part is at a maximum when the part is in the forming orientation compared to the thickness of the thinnest portion of the part when the part is formed in any of the plurality of orientations other than the forming orientation.

An illustrative computer system for orienting a part relative to a virtual plane parallel to a blank sheet, the part to be formed from the blank sheet by incremental sheet forming using a stylus perpendicular to the virtual plane, includes means for characterizing a shape of the part to be formed from a blank sheet that is parallel to a virtual plane. The computer system also includes means for identifying, relative to the virtual plane, a forming orientation of the part from multiple orientations. The thickness of the thinnest portion of the part is at a maximum when the part is in the forming orientation compared to the thickness of the thinnest portion of the part when the part is formed in any of the plurality of orientations other than the forming orientation.

Provided also is a computer program product that, in one or more aspects, includes a computer usable medium having a computer readable program code embodied therein. The computer readable program code is adapted to be executed to implement a method for orienting a part relative to a virtual plane parallel to a blank sheet, the part to be formed from the blank sheet by incremental sheet forming using a stylus perpendicular to the virtual plane. This method involves characterizing a shape of the part to be formed from a blank sheet that is parallel to a virtual plane and identifying, relative to the virtual plane, a forming orientation of the part from a plurality of orientations. The thickness of the thinnest portion of the part is at a maximum when the part is in the forming orientation compared to the thickness of the thinnest portion of the part when the part is formed in any of the plurality of orientations other than the forming orientation.

These and other examples are described further below with reference to the figures.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Provided methods and systems are used for identifying forming orientations of a part for incremental sheet forming. As used herein, a forming orientation is an orientation in which the thickness of the thinnest portion of the part is at a maximum among all considered orientations. However, other criteria may be used to define the forming orientation. In the provided methods and systems, a thickness profile for each considered orientation is evaluated using various computational techniques, such the Sine law. Furthermore, algorithms, such as Nelder-Mede algorithm, may be used to focus evaluation on the most probable orientations and to save computing resources and time. Once the forming orientation for a specific part is identified, this information may be used to actually form the part from the blank sheet using incremental sheet forming. In some examples, the forming-orientation information may be saved for future uses and/or transferred to another party for execution of incremental sheet forming.

Figure 1A:
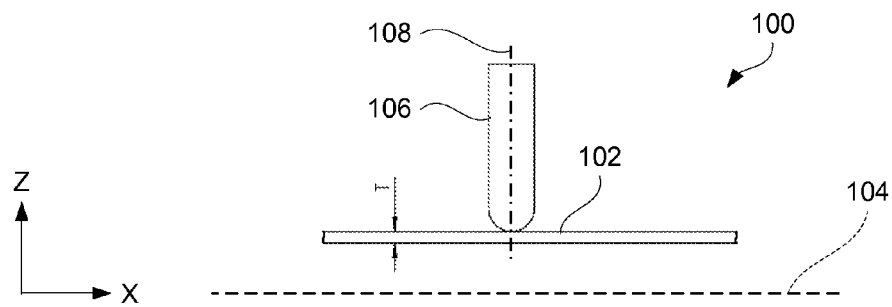
FIG. 1A is a schematic representation of an incremental sheet forming system including a blank sheet prior to its forming, in accordance with one or more aspects of the disclosure.

The Sine law and its impact on the thickness profile for different orientations of the formed part will now be explained with reference to FIGS. 1A-1C. Specifically, FIG. 1A is a schematic illustration of incremental sheet forming system 100 prior to forming blank sheet 102 using stylus 106. In this example, blank sheet 102 extends perpendicular to the Z axis, i.e., in the X-Y plane. While the Y axis is not shown in FIGS. 1A-1C, one of ordinary skills in the art would understand that Y axis is mutually orthogonal to the X and Z axes. Virtual plane 104 is defined as a plane that is parallel to (or coincides with) the blank sheet 102 prior to forming this sheet into a part. In this example, virtual plane 104 is also normal to center axis 108 of stylus 106. In other words, in this example, center axis 108 of stylus 106 is parallel to the Z axis. Virtual plane 104 is used as a reference to identify a forming orientation of the part. As further described below, an orientation of a part relative to virtual plane 104 may be defined by one or two angles.

During forming of blank sheet 102, stylus 106 may move in all three directions (i.e., the X direction, the Y direction, and the Z direction) with respect to blank sheet 102. Center axis 108 of stylus 106 remains perpendicular to virtual plane 104. These motions of stylus 106 deform blank sheet 102 into a particular shape as, for example, shown in FIGS. 1B and 1C. The Sine law assumes that the wall angle with respect to virtual plane 104, which may differ for different portions of the formed part, determines the thickness of the formed part at the location of this wall angle. In some examples, the wall angle relative to the virtual part 104 may differ for different portions of the part resulting in different thicknesses of these portions. Furthermore, the wall angles may change when the orientation of the entire part relative to the virtual plane 104 changes as further described with reference to FIGS. 1B and 1C. As such, each orientation has a corresponding thickness profile, and each thickness profile has an associated minimum thickness.

Incremental sheet forming may be performed without a backing die or with a backing die, as further described below. When a backing die is used (shown as elements 125 and 135 in FIGS. 1B and 1C respectively), the backing die defines the orientation of the formed part.

Figure 1B:
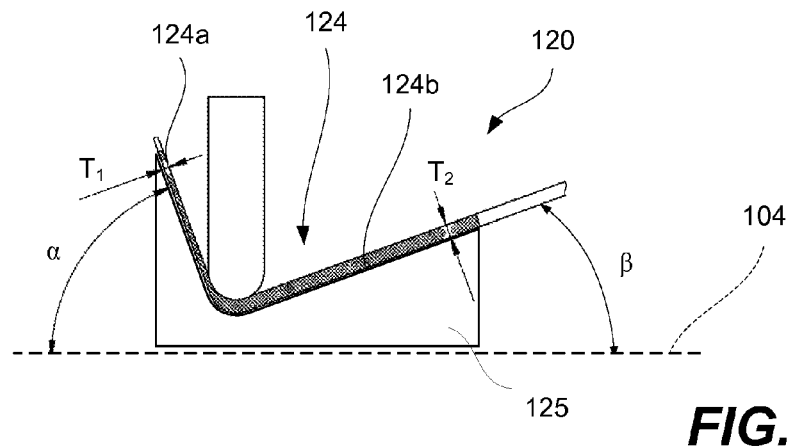
FIG. 1B is a schematic representation of the incremental sheet forming system after forming the part in a non-forming orientation, in accordance with one or more aspects of the disclosure.
Figure 1C:
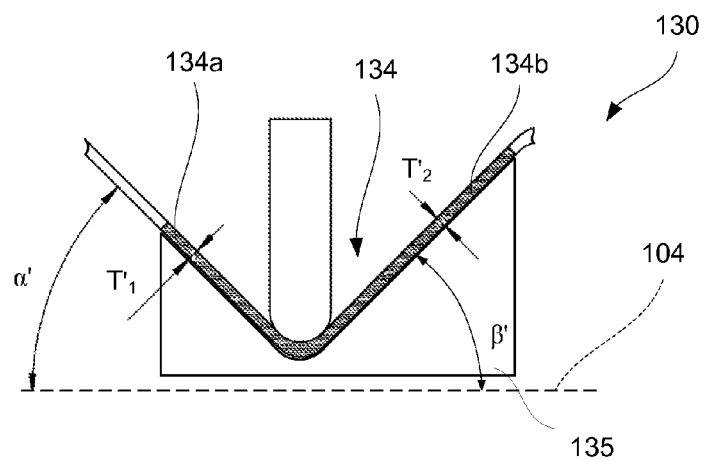
FIG. 1C is a schematic representation of the incremental sheet forming system after forming the part in a forming orientation, in accordance with one or more aspects of the disclosure.

FIG. 1B is a schematic illustration of incremental sheet forming system 120 after forming part 124 from the blank sheet. Generally, only a portion of the blank sheet is used to form part 124. The remainder of the blank sheet may be referred to as waste portions. The waste portions provide support to part 124 during and after forming. The waste portions may be cut off or otherwise removed later. Thickness profiles of the waste portions are generally irrelevant and may be generally not considered. As such, the waste portions may not be considered when the forming orientation is identified.

Part 124 shown in FIG. 1B may be conceptually divided into first portion 124a and second portion 124b. First portion 124a is at an angle α relative to virtual plane 104. Second portion 124b is at an angle β relative to virtual plane 104. For purposes of this document, angles α and β are referred to as projection angles. Those skilled in the art will appreciate that larger projection angles result in smaller projections of the formed portions of part 124 onto virtual plane 104.

The Sine law is a method of estimating the thickness profile of parts formed using incremental sheet forming. According to the Sine law, the relationship between the initial thickness ($t_{Initial}$) and the formed thickness ($t_{Formed}$) depends on the projection angle ($\phi$) according to the following equation:

$$t_{Formed} = t_{Initial} \times (1 - \sin \phi) \quad \text{(Equation 1)}$$

In this form, the Sine law is applicable to simple bends and axisymmetric shapes. Examples of simple bends are shown in FIGS. 1B and 1C. The Sine law predicts that no thinning occurs in portions that are not bent and have a 0° projection angle. At the 0° projection angle, the portion is parallel to virtual plane 104. However, portions extending perpendicularly relative to virtual plane 104 and, therefore, having a 90° projection angle, will have zero thickness according to the Sine law. In the latter case, the sheet will be considered torn for these portions. Overall, different portions of a part having different projection angles will be expected to have different thicknesses.

In the example of FIG. 1B, the projection angle (α) of first portion 124a is greater than the projection angle (β) of second portion 124b. As a result, the thickness ($T_1$) of first portion 124a is expected to be smaller than the thickness ($T_2$) of second portion 124b. This result may not be acceptable in some instances, for example, when a more uniform distribution of the thickness is needed in the formed part. One possible criterion for incremental sheet forming is to keep the thickness of the thinnest portion at a maximum. This criterion is not met for the part shown in FIG. 1B or, more specifically, for the orientation of the part shown in FIG. 1B. As noted above, a part may be formed in different orientations resulting in different thickness profiles. In some examples, criteria other than keeping the thickness of the thinnest portion at a maximum may be used to determine a forming orientation. In some examples, multiple criteria may drive selection of the orientation for incremental sheet forming.

Figure 1D:
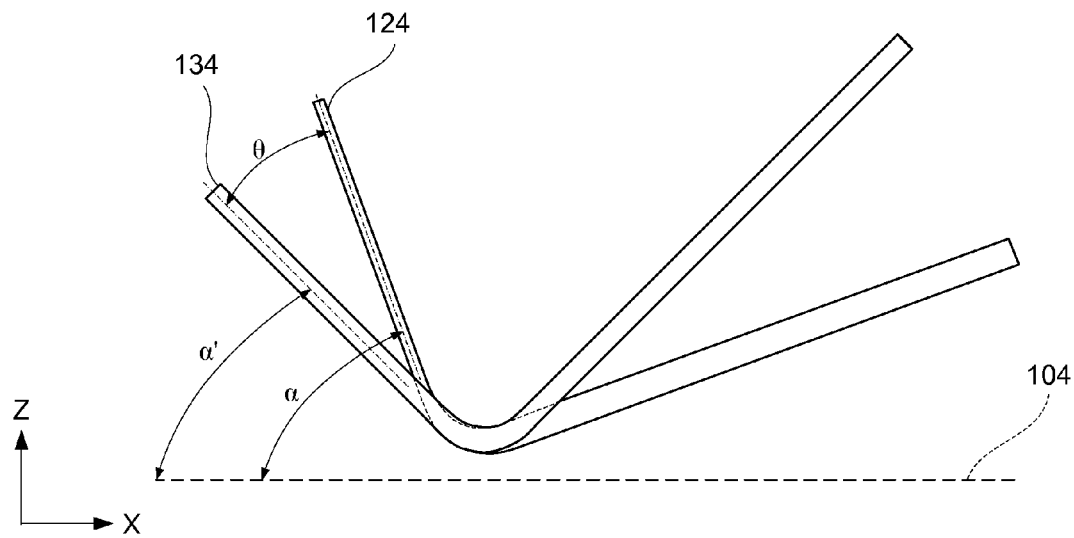
FIG. 1D is an overlay of two parts having the same shape but formed in two different orientations, the overlay comparing the relative orientations of the parts after forming, in accordance with one or more aspects of the disclosure.

In order to increase the thickness of first portion 124a, the projection angle (α) needs to be decreased by changing orientation of part 124 relative to virtual plane 104. It should be noted that the shape of the part does not change when changing its orientation, but the thickness profile of the part changes. Specifically, the thicknesses of different portions may change due to the change in respective projection angles, which are angles between these portions and virtual plane 104. FIG. 1C is a schematic illustration of incremental sheet forming system 130 having part 134, formed in a different orientation relative to virtual plane 104 than part 124, shown in FIG. 1B. The relative orientations of parts 124 and 134 are shown in FIG. 1D. Part 134 can be also conceptually divided into first portion 134a and second portion 134b. These portions generally correspond to first portion 124a and second portion 124b of part 124. However, first portion 134a has a smaller projection angle (α') than first portion 124a and, as a result, has a larger thickness ($T'_1$) than first portion 124a. At the same time, second portion 134b has a larger projection angle (β') than second portion 124b and, as a result, has a smaller thickness ($T'_2$) than second portion 124b. Specifically, in this example, the projection angle (α') is the same as the projection angle (β'). As a result, first portion 134a has the same thickness ($T'_1$) as the thickness ($T'_2$) of second portion 134b. In some examples, configuration of the part 134 may be chosen as the forming orientation because the thickness of the thinnest part is at a maximum in this configuration compared to the thickness of the thinnest portion of the part when the part is formed in any of the plurality of orientations other than the forming orientation. In other words, in this example, any other orientations, in which the two projection angles (α' and β') are not the same, will yield a non-uniform thickness and the thickness of the thinnest part will not be at a maximum.

FIG. 1D illustrates an overlay of two parts 124 and 134 in their actual orientations to highlight the difference in these orientations relative to virtual plane 104. Specifically, part 134 is rotated through an angle (θ) counterclockwise relative to part 124. In the illustrated example, part 134 is rotated around the Y axis relative to part 124. In general, orientation of the part may change around one or two axes, e.g., around the X-axis and/or around the Y-axis. In this example, the Z-axis may be parallel to the center axis of the stylus. As such, the orientation of a part may be characterized by one or two angles of rotation relative to the virtual plane.

Figure 1E:
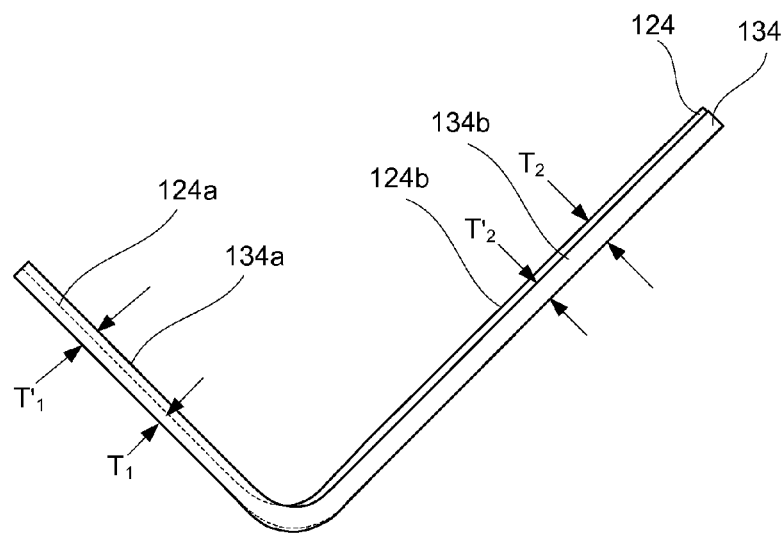
FIG. 1E is an overlay of two aligned parts of FIG. 1D, the overlay comparing the thickness profiles of the two parts, in accordance with one or more aspects of the disclosure.

FIG. 1E illustrates an overlay of two parts 124 and 134 exemplifying thickness profiles of the two parts caused by different orientations of the parts. The thickness ($T_1$) of first portion 124a of part 124 is thinner than the thickness ($T'_1$) of first portion 134a of part 134. On the other hand, the thickness ($T_2$) of second portion 124b of part 124 is thicker than the thickness ($T'_2$) of second portion 134b of part 134. Overall, part 134 has a more uniform thickness profile than the thickness profile of part 124 due to the different orientations of the two parts during the forming process. As such, the thickness of the thinnest portion of part 134 is greater than the thickness of the thinnest portion of part 124. Part 134 is considered to be in a forming orientation because this orientation maximizes its minimum thickness. As noted above, different orientations of the part may be evaluated to identify a forming orientation of the part that satisfies certain criteria, such as having a thickness of the thinnest portion of the part at the maximum when the part is in the forming orientation compared to the thickness of the thinnest portion of the part when the part is formed in any of the plurality of orientations other than the forming orientation, as further described below with reference to FIG. 2.

Processing Examples

Figure 2:
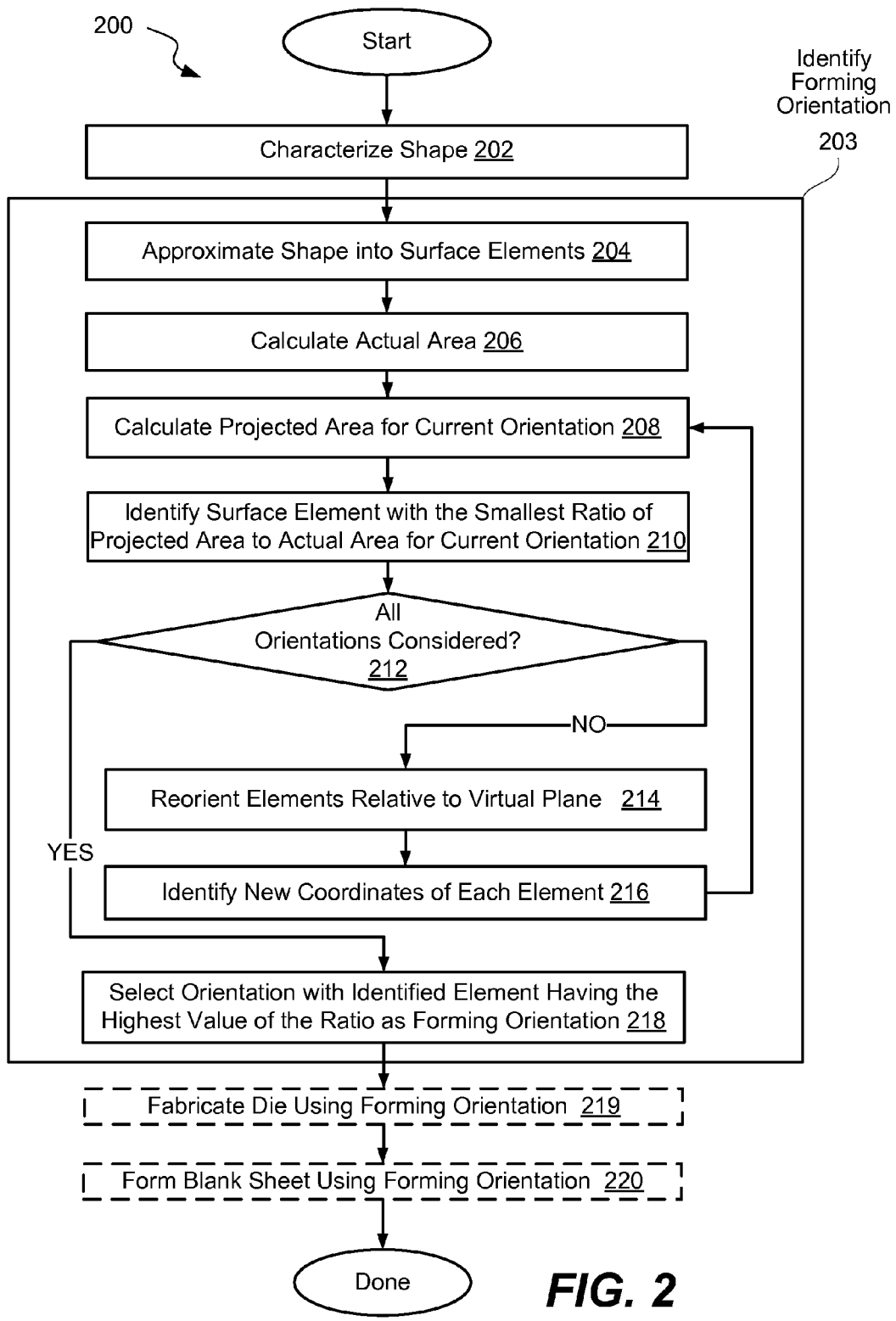
FIG. 2 is a process flowchart corresponding to a method of forming a blank sheet using incremental sheet forming; the method involving identifying a forming orientation of the part, in accordance with one or more aspects of the disclosure.

FIG. 2 is a process flowchart corresponding to an illustrative method 200 of orienting a part relative to a virtual plane parallel to a blank sheet. This part is to be formed from the blank sheet by incremental sheet forming. In some examples, method 200 also involves actual forming operations and may be referred to as a method of forming a part using incremental sheet forming. Method 200 may commence with characterizing a shape of the part to be formed during operation 202. The part may be formed from a blank sheet made from various materials suitable for incremental sheet forming, such as aluminum, titanium, steel, stainless steel, copper, nickel, and alloys thereof. The virtual plane may be defined as a plane that would be parallel to the blank sheet during forming. In some instances, the virtual plane is also used as a reference to characterize the shape. For example, an X-Y plane may be used as a virtual plane. In this example, the X-Y-Z coordinates may be used for defining the shape and various orientations of the part.

In some examples, operation 202 may involve receiving a representation of the part, such as a computer-aided design (CAD) model of the part or developing such a model using a CAD system. For example, INVENTOR® (supplied by Autodesk, Inc. in San Rafael, Calif.), SOLIDWORKS® and CATIA® (both supplied by Dassault Systèmes SolidWorks Corporation in Waltham, Mass.) software packages may be used to develop the representation of the part during operation 202 or prior to operation 202. In some examples, method 200 may be executed by a computer program that is partially or fully integrated into the CAD system. For example, the orientation of a part for incremental sheet forming may be used by a sheet forming module of the CAD system that is also used to develop the representation of the shape.

The shape of the part may be represented in CAD by a surface model or by a solid model. In the case of a solid model, the surface to be formed could be represented by the inner surface, the outer surface, or the mid-plane surface. For purposes of this description, the outer surface of the solid model corresponds to a surface of the physical part that comes in contact with the moving stylus. It should be noted that incremental sheet forming typically only allows forming parts that do not have surfaces tilted beyond the normal to the virtual plane, as these surfaces cannot be accessed by a stylus which is orientated normal to the plane. Accordingly, some shapes cannot be formed using incremental sheet forming in any orientations. Other shapes can be formed in some orientations, but not all orientations.

The shape information may be extracted from the provided representation of the part during operation 202. In some examples, the representation may also include part thickness information. For example, a representation of the part may be provided. The thickness information may be ignored or used as guidance for selecting a properly dimensioned blank sheet and/or setting one or more criteria for identifying the forming orientation. For example, the thickness information may be used to determine a thickness threshold that should be met while identifying the forming orientation of the part.

Method 200 may proceed with identifying, relative to the virtual plane, a forming orientation of the part during operation 203. The part is not actually formed until later operations or may not be formed at all. Operation 203 may involve a set of computational operations that may be performed using a computer system. As such, any reference to the part in the context of identifying the forming orientation is made to a virtual part that represents the actual part that may be later formed.

The forming orientation may be one of many considered orientations that form a set. Different orientations in the set may be identified by selecting angles of these orientations relative to the virtual plane. Rotations may be performed around one axis that is parallel to the virtual plane or around two axes that are parallel to the virtual plane. Generally, any two axes that are not parallel to each other may be used for this purpose. In some examples, the two axes may be normal to each other. For example, the virtual plane may be an X-Y plane, and the X axis and the Y axis may be used for rotation of the shape and identifying different orientations of the part.

When only one axis of rotation is used, each orientation of the part in the set of possible orientations may be characterized by one angle of rotation relative to this axis. In this case, the set of orientations represents a one dimensional array. As such, identifying the forming orientation may involve identifying an angle of the part relative to an axis in the virtual plane. Alternatively, two axes of rotation may be used. In this case, each orientation in the set may be characterized by a different combination of two angles, each angle defined relative to its own axis of rotation. In this case, the set of orientations of the part represents a two-dimensional array. As such, identifying the forming orientation may involve identifying two angles, each relative to its own axis of rotation. For example, increments of 0.5°, 1°, 1.5°, 2°, 3°, etc. may be used to differentiate part orientations in a set. The rotational range may be from 0° to 360°.

In some examples, the rotation range may be narrowed to exclude angles that are not possible with the incremental sheet forming, e.g., angles that cause any portion of the shape to tilt beyond the normal angle relative to the virtual reference plane. To exclude the part orientations that are not possible, the surface normal is checked at all locations on the surface of the modeled part. If the Z component of the surface normal is negative at any location, the orientation is considered to be not suitable for forming the part.

In some examples, identifying the forming orientation involves determining a thickness profile of the part in each orientation and identifying a thickness of the thinnest portion in each orientation. An orientation with the maximum value of the thickness of the thinnest portion (compared to the thickness of the thinnest portion of the part when the part is formed in any of the plurality of orientations other than the forming orientation) is selected as the forming orientation of the part during operation 203.

Figure 3:
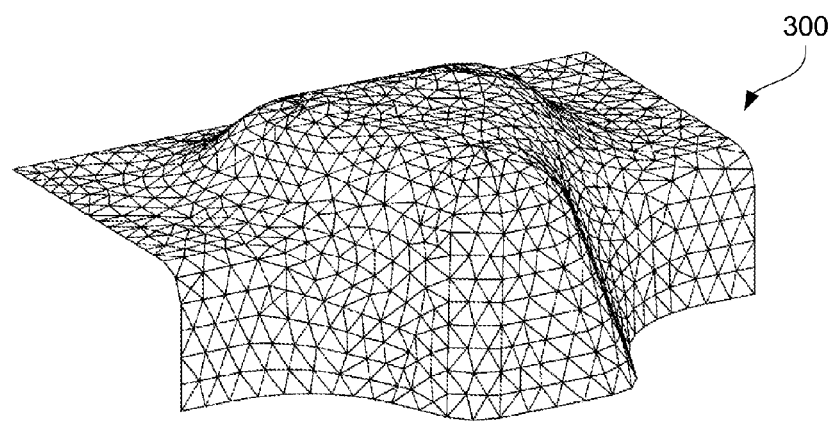
FIG. 3 is a schematic illustration of a surface having surface elements identified thereon, in accordance with one or more aspects of the disclosure.

The overall operation 203 may involve a set of operations, as shown in FIG. 2. First, the shape of the part may be approximated using multiple surface elements during operation 204. In general, a collection of flat shapes, referred to herein as "elements", may be used to represent the shape, provided the elements can be connected together without forming gaps. Typical examples include triangular and quadrilateral elements. The number of the surface elements may depend on the desired accuracy of analysis, computer resources available, desirable duration of analysis, complexity of the shape, and similar factors. Some examples of approximating techniques associated with operation 203 may include a tessellation and a surface meshing. The tessellation generally produces the minimum number of flat triangles for reconstructing the shape. Meshing may be used to produce a more regular distribution of surface elements, which, in some examples, makes meshing techniques more suitable for certain numerical simulation tasks. Typically, the tessellation can be executed using various CAD packages, whereas meshing can be executed using various simulation packages. FIG. 3 illustrates an example of surface 300 approximated using, e.g., a meshing function of the SOLID-WORKS® package. It should be noted that when the shape of the part is approximated using multiple surface elements, the shape is in one of the plurality of orientations relative to the virtual plane. This orientation of the shape relative to the virtual plane yields initial coordinates of the shape.

The method may proceed with calculating an actual area of each surface element during operation 206. The actual area may be calculated based on the coordinates of each surface element, using, e.g., Cartesian coordinates. When triangles are used as surface elements, coordinates of their corners may be used to calculate the actual area as well as the projected area of such triangles, as further described below. For example, corner coordinates of a triangle may be identified as: $(X_1, Y_1, Z_1)$, $(X_2, Y_2, Z_2)$, and $(X_3, Y_3, Z_3)$. The actual area of this triangle may be calculated using the following equation:

$$\text{Actual Area} = \frac{1}{2} \times \sqrt{\frac{(U_1 \times V_2 - U_2 \times V_1)^2 +}{(U_1 \times V_2 - U_2 \times V_1)^2 + (U_1 \times V_2 - U_2 \times V_1)^2}} \qquad \text{(Equation 2)}$$

where $U_0 = X_3 - X_1$; $U_1 = Y_3 - Y_1$; $U_2 = Z_3 - Z_1$
$V_0 = X_2 - X_1$; $V_1 = Y_2 - Y_1$; $V_2 = Z_2 - Z_1$ Those skilled in the art would appreciate how to calculate actual areas for other types of surface element and/or coordinate systems.

The method may proceed with calculating the projected area of the surface elements during operation 208. The virtual plane, e.g., virtual plane 104 of FIG. 1A, may be used to determine a normal projection of each surface element. It should be noted that the projected area of the part is a function of the orientation of the part relative to the virtual plane and, therefore, is calculated for a given (current) orientation of the part relative to the virtual plane and represents a normal projection of the part onto the virtual plane. The projected area may change as the orientation of the part changes. On the other hand, the actual area of the part does not depend on its orientation relative to the virtual plane and will remain the same regardless of that orientation.

As such, the actual area of each surface element needs to be determined only once during the entire analysis, while the projected area of each surface element is recalculated for each new orientation of the part.

Continuing with the above example, in which triangles are used as surface elements, the X-Y plane may be used as a virtual plane. In this case, the projected area of each triangle may be calculated using the following equation:

$$\text{Projected Area} = \frac{1}{2} \times |(S_0 \times T_1) - (S_1 \times T_0)| \qquad \text{(Equation 3)}$$

where $S_0 = X_3 - X_1$; $S_1 = Y_3 - Y_1$
$T_0 = X_2 - X_1$; $T_1 = Y_2 - Y_1$ $(X_1, Y_1, Z_1)$, $(X_2, Y_2, Z_2)$, and $(X_3, Y_3, Z_3)$ coordinates correspond to the current orientation of the part and will change as the orientation of the part relative to the virtual plane changes. Those skilled in the art would appreciate how to calculate projected areas for other types of surface element and/or coordinate systems.

The method may proceed with identifying a specific surface element having the smallest ratio of the projected area (area projected onto the virtual plane) to the actual area among all surface elements used to approximate the part during operation 210. This identification is performed for a given orientation of the part relative to the virtual plane. As such, each orientation of the part is associated with a specific surface element having the minimum ratio of projected area to actual area as compared to the rest of the surface elements used to approximate the part. The specific surface element identified during operation 210 may be the same element for different orientations of the part relative to the virtual plane, or may be a different element. As already stated, each orientation of the part is associated with the smallest ratio of the projected area to actual area for a specific surface element. Based on the Sine law described above, the portion of the part corresponding to this surface element will be the thinnest portion of the part if the part is actually formed in this orientation. Forming criteria may involve determining an orientation of the part in which the specific surface element having the smallest ratio of the projected area to the actual area when compared to all the other elements modeling the part has the highest possible (maximum) ratio.

Figure 4A:
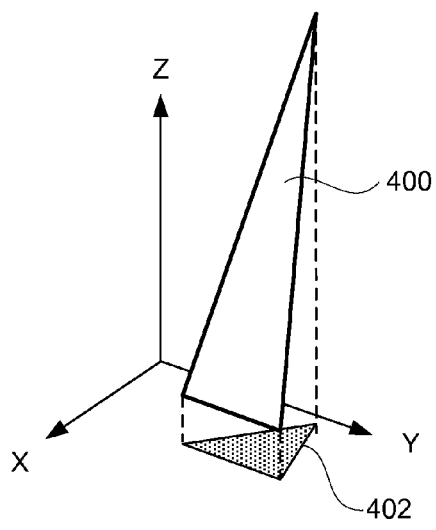
FIG. 4A is a schematic illustration of a surface element and its projection area, in accordance with one or more aspects of the disclosure.
Figure 4B:
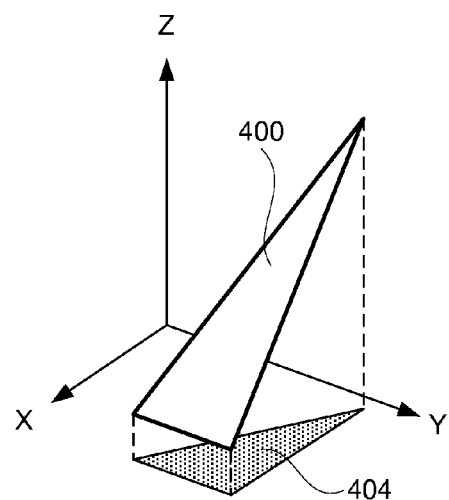
FIG. 4B is a schematic illustration of the same surface element having a different orientation and, as a result, a different projection area, in accordance with one or more aspects of the disclosure.

FIGS. 4A and 4B illustrate the same surface element having different orientations relative to the virtual plane, e.g., virtual plane 104 of FIG. 1A and, as a result, different ratios of projected area to actual area. Specifically, FIG. 4A illustrates a triangular surface element 400 in a given orientation with respect to the X-Y plane. The projection of element 400 onto the X-Y plane is shown as triangle 402. FIG. 4B illustrates the same surface element 400 in a different orientation, whereby the gradient of the element with respect to the X-Y plane is not as steep. The projection of element 400 is represented in FIG. 4B as triangle 404. It is apparent that the area of triangle 404 is greater than that of triangle 402. As such, the orientation of the part corresponding to surface element 400, shown in FIG. 4B, will be selected over the orientation of the part corresponding to element shown in FIG. 4A if the thickness of the portion of the part corresponding to such a surface element is to be maximized.

The method may proceed with determining whether all orientations in the set were considered, as reflected by decision block 212. In some examples, a new orientation may be selected based on analysis of one or more previous orientations. Various global search and convergence algorithms may be used for this purpose and to reduce the overall computational burden. For example, if 3° increments are used for the complete rotation of 360° rotations around two axes, then the number of all possible orientations will be: (360°/3°)×(360°/3°)=14,400. In some instances, such as highly curved surfaces, the rotation increments must be a lot smaller, resulting in an even greater number of possibilities. Performing calculations for all surface elements for all possible orientations may require lots of processing power and may take a long time. The number of orientations that needs to be analyzed to determine a working orientation with sufficient precision may be reduced using one or more global search and convergence algorithms. Some examples of these algorithms include the Nelder-Mead algorithm, genetic-evolution algorithm, and simulated annealing algorithm. These algorithms may use variable rotation increments. For example, an algorithm may start with scanning the entire domain using large rotation increments to identify the general location of the global maximum. The algorithm then may switch to smaller increments to more precisely determine the location of the maximum.

The Nelder-Mead is a heuristic goal seeker-type of algorithm. The process may begin with an initial simplex of points. For the case of rotation about the X axis and the Y axis, this means that initially three orientations need to be selected, where each orientation contains an $R_X$ value and an $R_Y$ value. The minimum Sine-law thickness or ratio is then evaluated for each of these three orientations, as noted above. The best two orientations are selected as the basis for calculating a new orientation value, such as the thickness or ratio. This new operational value is the worst value "reflected" about a line made from the two best values. The minimum Sine-law thickness or ratio of this new orientation is then calculated and tested to see if it has a better or worse value than the previously found values. Depending on this outcome, yet more orientations are found. This cycle continues until the difference between the orientations becomes small enough that it falls within a nominated tolerance value. The solution has then converged.

Consider a 3D plot, in which the two independent variables represent angles of rotation around two axes in the virtual plane and the dependent variable is the minimum Sine-law thickness or ratio. On this plot, an initial triangle containing three points is chosen, where each point defines a given orientation. This is termed a 'simplex'. In the Nelder-Mead optimization algorithm, this simplex changes size and shape as the solution progresses. If the simplex were to be animated to illustrate iterative evaluations of different orientations, it would appear as if the simplex changes its shape and climbs up the nearest peak. As the solution progresses, the simplex gets smaller and contracts toward the very top of the peak. To avoid the Nelder-Mead algorithm getting trapped in a local optimum and potentially missing the true global optimum, a multi-run solution sequence may be used. The multi-run solution sequence involves preselecting a few (e.g., thirty) different initial simplexes and executing the Nelder Mead algorithm for each of these simplexes. When the solutions have been completed the user can, for example, automatically select the solution with the greatest minimum thickness.

If an additional orientation of the part relative to the virtual plane needs to be considered, then the method proceeds with reorienting the shape of the part, approximated with the surface elements relative to the virtual plane during operation 214. The new orientation of the part may have new projection areas of the surface elements. In order to find these projection areas, the method proceeds with identifying new coordinates of each surface element during operation 216. These new coordinates depend on angles of rotation from the previous orientation or from some other reference orientation (e.g., an initial orientation). When the Cartesian coordinates are used, the new coordinates of rotation around the X axis may be calculated using the following equation involving matrix multiplication:

$$\begin{bmatrix} X' \\ Y' \\ Z' \end{bmatrix} = \begin{bmatrix} 1 & 0 & 0 \\ 0 & \cos\theta & -\sin\theta \\ 0 & \sin\theta & \cos\theta \end{bmatrix} \times \begin{bmatrix} X \\ Y \\ Z \end{bmatrix} \quad \text{(Equation 4)}$$

where X, Y, and Z are the coordinates of the point prior to the rotation; X', Y', and Z' are the coordinates of the point after the rotation; θ is the angle of rotation around the X axis. The new coordinates for rotation around the Y axis may be calculated using the following equation involving matrix multiplication:

$$\begin{bmatrix} X' \\ Y' \\ Z' \end{bmatrix} = \begin{bmatrix} \cos\varphi & 0 & \sin\varphi \\ 0 & 1 & 0 \\ -\sin\varphi & 0 & \cos\varphi \end{bmatrix} \times \begin{bmatrix} X \\ Y \\ Z \end{bmatrix} \quad \text{(Equation 5)}$$

where X, Y, and Z are the coordinates of the point prior to the rotation; X', Y', and Z' are the coordinates of the point after the rotation; φ is the angle of rotation around the Y axis.

Once the new coordinates of each surface element are determined, operations 208 and 210 are repeated using these new coordinates. Specifically, a new projected area of each surface element is calculated with the part being in the new (current) orientation during operation 208. The surface element having the smallest ratio of the projected area to the actual area among the surface elements is identified and stored during operation 210.

When all orientations are considered, the method proceeds with selecting an orientation, from all considered orientations, that has the highest value of the ratio for the specific surface element during operation 218. This orientation is referred to as a forming orientation. This forming orientation is selected from all considered orientations, such that the specific surface element associated with the forming orientation has the highest value of the smallest ratio of the projected area to the actual area of any other specific surface element associated with any other orientation of the considered orientations. The forming orientation may be characterized by one or two angles of rotation about axes in the virtual plane. This information may be presented to a user on a user interface of a computer system, added to the electronic file containing the shape information, and/or sent to the incremental forming apparatus.

Figure 5A:
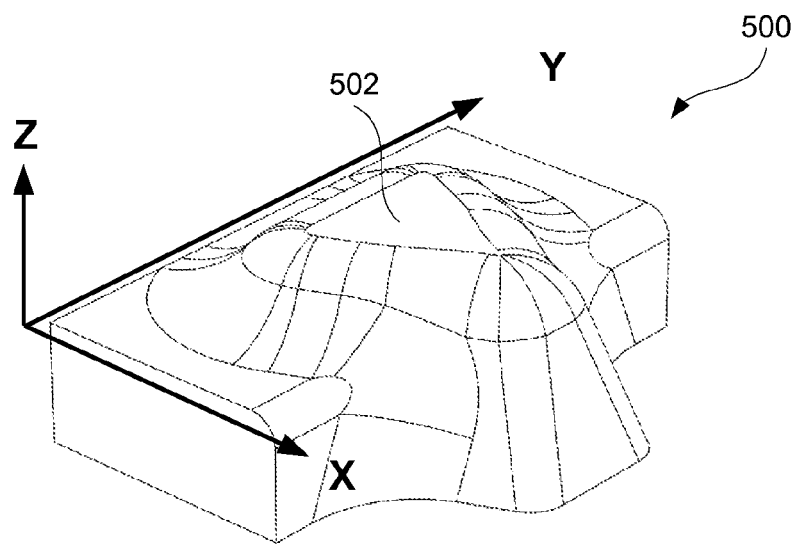
FIGS. 5A and 5B are schematic illustrations of a male backing die having two different orientations, in accordance with one or more aspects of the disclosure.
Figure 5B:
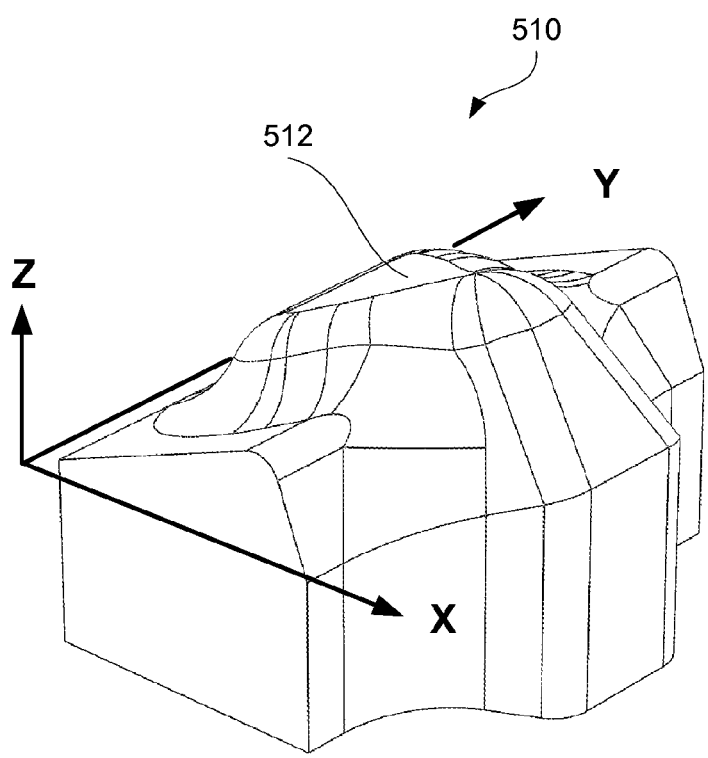
Figure 5C:
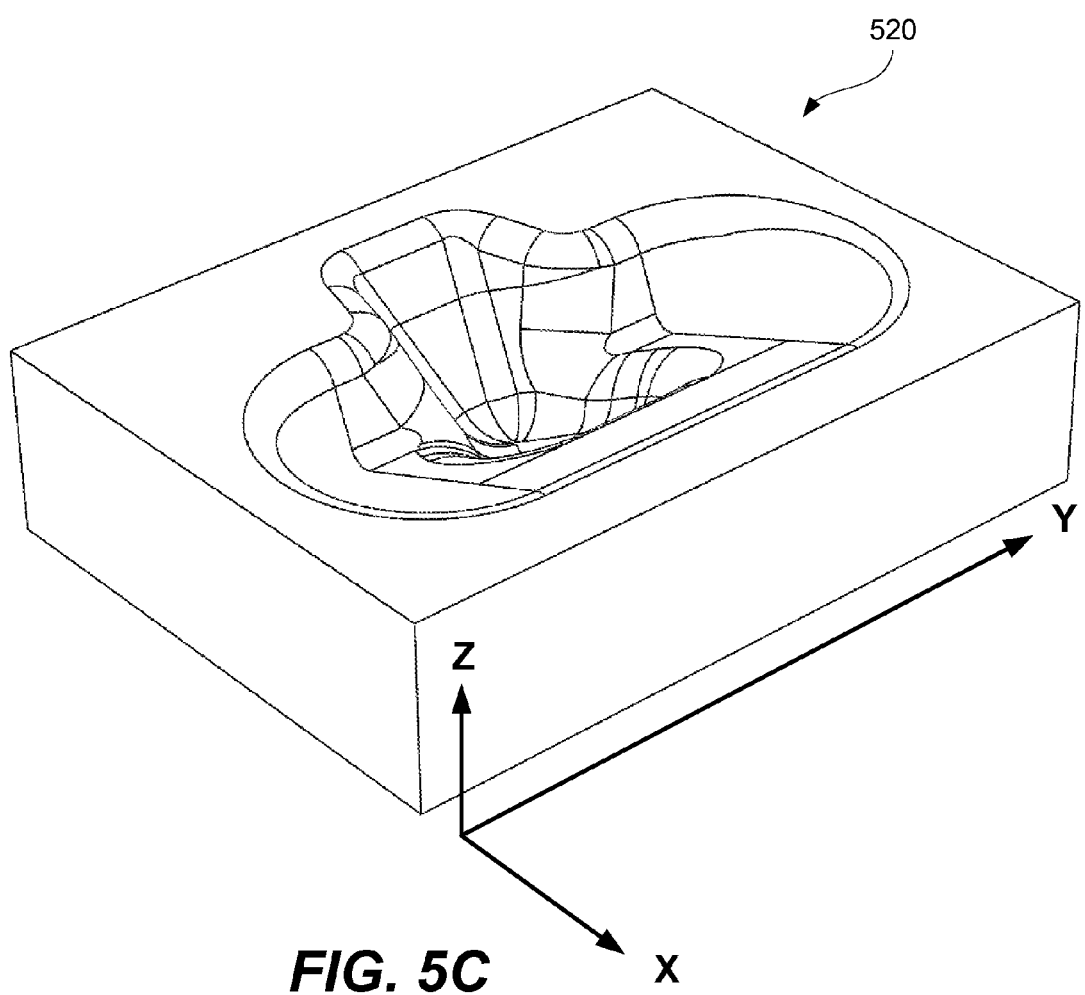
FIG. 5C is a schematic illustration of a female backing die, in accordance with one or more aspects of the disclosure.

In some examples, method 200 proceeds with fabricating a die for positioning the part in the forming orientation during forming of the blank sheet, as reflected by block 219. The identified forming orientation may be used to design the die as further described below with reference to FIGS. 5A-5C. Furthermore, in some examples, method 200 proceeds with forming a blank sheet into the part, with the part being in the forming orientation, as reflected by block 220. Forming the blank sheet into the part may be performed using one of two-point incremental forming or single-point incremental forming, as further described below with reference to FIG. 6. The two-point incremental forming process uses a backing support that may be in the form of a male die or a female die. FIGS. 5A and 5B illustrate two examples of male dies 500 and 510, used to form the same shape but with different orientations of the part relative to the X-Y plane. Male die 500 has a top surface 502 being substantially parallel to the X-Y plane. Male die 510 has its top surface 512 at an angle relative to the X-Y plane. More specifically, top surface 512, as well as other surfaces of male die 510, are rotated a specific angle around the Y axis, as compared to top surface 502 and other surfaces of male die 500. FIG. 5C illustrates an example of a female die 520 to form the shape similar to the one that can be formed with the male dies described above with reference to FIGS. 5A and 5B. Female die 520 also defines a specific orientation of the formed part. Overall, forming orientations of parts identified using various methods and systems described herein can be used not only for incremental sheet forming of the parts, but also for designing tools for the incremental sheet forming process.

Examples of Incremental Sheet Forming Systems

Figure 6:
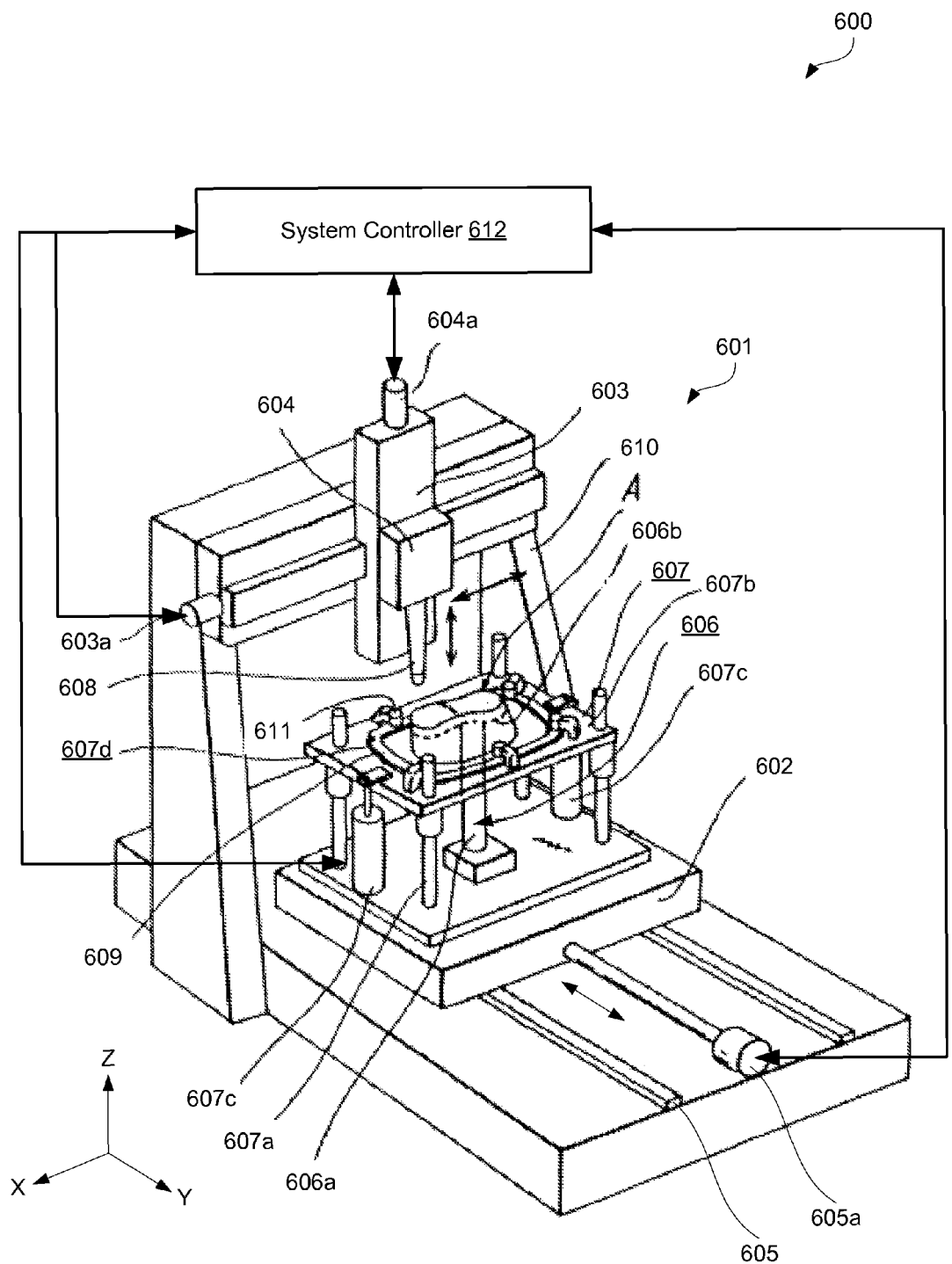
FIG. 6 is a schematic illustration of an incremental sheet forming system, in accordance with one or more aspects of the disclosure.

Turning now to FIG. 6, an illustration of an incremental sheet forming system 600 is depicted, in accordance with some examples. Incremental sheet forming system 600 includes an apparatus 601 and a system controller 612. Apparatus 601 may include a table 602 to support a blank sheet while forming a part from the blank sheet. Apparatus 601 also includes a stylus 608, functioning as a tool for carrying out progressive forming of the part. Stylus 608 is sometimes referred to as a pressing mechanism and may have a curved surface at the lower end that comes in contact with the blank sheet during forming. Stylus 608 is movable along the Z-axis (the vertical direction) when forming the blank sheet. Stylus 608 may be supported on slider 604 and may be coupled to drive device 604a, configured to move stylus 608 along the Z-axis.

Table 602 is also movable relative to stylus 608 along the X-axis and along the Y-axis. In some examples, table 602 is configured to move in both of these directions, while stylus 608 is only movable along the Z-axis. In other examples, table 602 is stationary, while stylus 608 is configured to move along all three axes. In further examples, table 602 is configured to move along one of the X and Y axes, while stylus 608 is configured to move along the other one of the X, Y, and Z axes. For example, FIG. 6 illustrates table 602 being movable along the Y axis and stylus 608 movable along the X and Z axes. Stylus 608 is shown supported on slider 603 and coupled to drive device 603a for moving stylus 608 along the X-axis. Likewise, table 602 is shown supported on slider 605 and coupled to drive device 605a for moving stylus 608 along the Y-axis. In further examples, both table 602 and stylus 608 are movable along the X-axis and along the Y axis whilst stylus 608 can also move in the Z axis. Regardless of these configurations, drive devices may be coupled to system controller 612, which precisely controls position of table 602 relative to stylus 608 in all three dimensions. For example, stylus 608 may be driven along a computer numerical control (CNC) tool path to deform a flat blank sheet into a part.

Incremental sheet forming system 600 may be used for Single-Point Incremental Forming (SPIF), in which the forming is done without an underlying support in place. System 600 may also be used for Two-Point Incremental Forming (TPIF), which utilizes a support under the back surface of the formed sheet. The support may be in the form of a central post having a generic shape, for example, stylus-like shape. Alternatively, the support may be in the form of a die having a shape close to that of a formed part, as illustrated, for example, in FIGS. 5A-5C. It should be noted that different forming orientations determined in accordance with methods described above may drive different positions and even shapes of the backing support. For example, when a die is used, the die needs to be made to reflect the forming orientation or positioned in incremental sheet forming system 600 in the forming orientation. FIG. 6 illustrates a die 606 supported by stand 606a for TPIF. Die 606 may be removed when system 600 is used for SPIF.

FIG. 6 also illustrates holding mechanism 607, including multiple support pillars 607a, mounted on table 602, and a backing die 607b, disposed on the support pillars 607a. In some examples, holding mechanism 607 also includes at least one pair of actuators 607c for moving backing die 607b along the Z axis. Actuators 607c may be also controlled by system controller 612. Backing die 607b provides support to the sheet while it is being formed. Backing die 607b may be shaped like a frame having an opening somewhat larger than the part. Backing die 607b may include a sheet restraining mechanism 607d for clamping a peripheral portion (flange portion) of the sheet. Restraining mechanism 607d may have a frame-shaped restraining plate 609, which makes contact with the upper side of the peripheral portion of the sheet. Restraining mechanism 607d may also have multiple restraining actuators 611 for applying a controlled pressing force to the sheet periphery.

Specific examples of an apparatus 601 include Dieless NC Machine, such as DLNC-RA, DLNC-RB, DLNC-PA, DLNC-PB, DLNC-PC, and DLNC-PD, available from Amino North America Corporation in St. Thomas, Canada.

Examples of Controller Computer Systems

Figure 7:
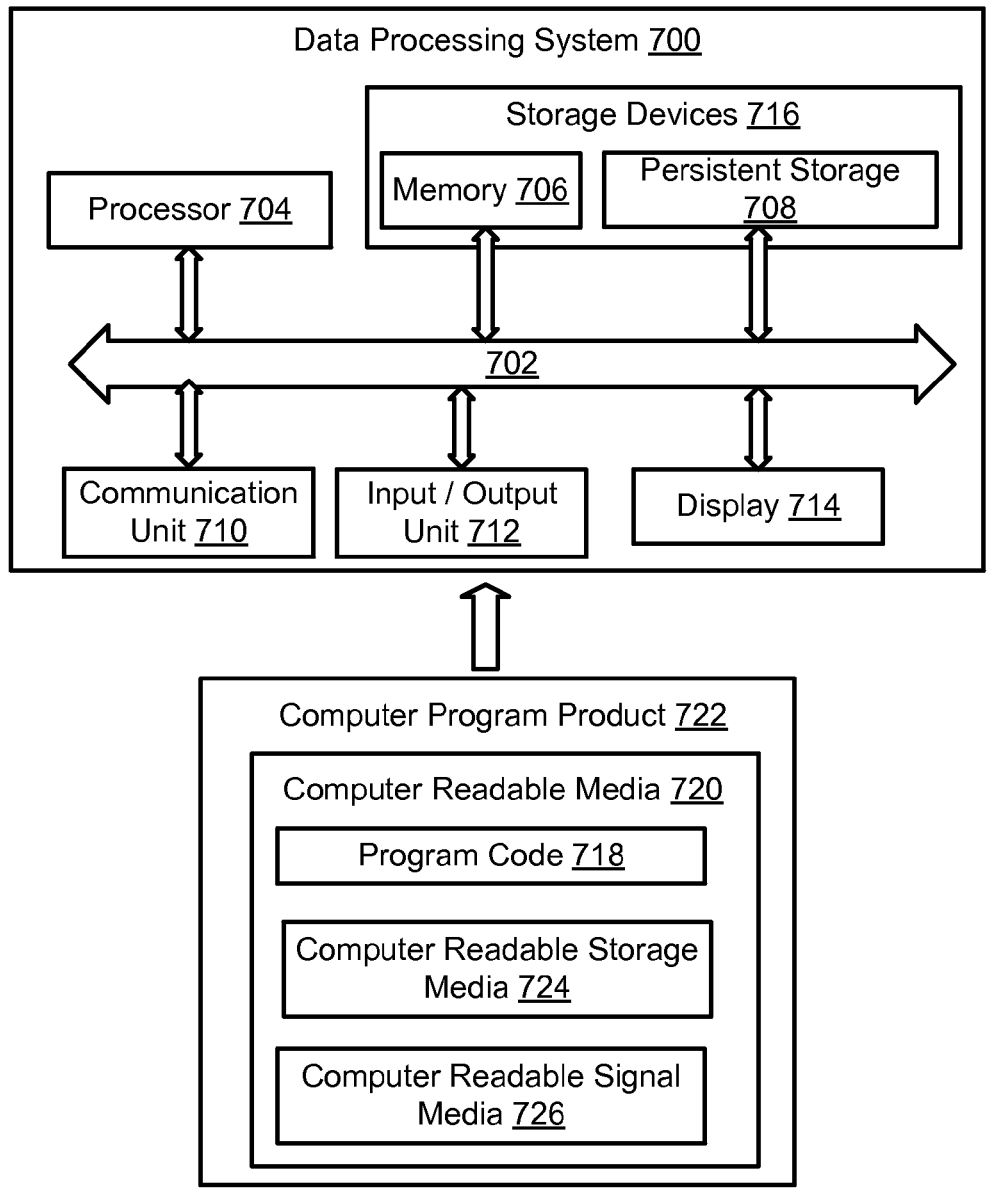
FIG. 7 is a block diagram illustrating a data processing system for identifying a forming orientation and, in some examples, for controlling an incremental sheet forming system.

Turning now to FIG. 7, an illustration of a data processing system 700 is depicted in accordance with some examples. Data processing system 700 may be used to implement one or more computers used in a controller or other components of various systems described above. In some examples, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device may be any hardware component capable of storing data, program code in functional form, and/or other suitable information either on a temporary basis and/or on a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different examples may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different examples may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different examples may be implemented. The different illustrative examples may be implemented in a data processing system including components in addition to and/or in place of those illustrated for data processing system 700. Other components, shown in FIG. 7, can be varied from the illustrative examples shown. The different examples may be implemented using any hardware device or system capable of running program code 718.

Provided also is a computer system for orientating a part for incremental sheet forming thereof. The computer system includes a memory configured to store a characterization of a shape of the part to be formed from a blank sheet that is parallel to a virtual plane. The computer system also includes a processor configured to identify, relative to the virtual plane, a forming orientation of the part from multiple orientations. The thickness of the thinnest portion of the part is at the maximum when the part is in the forming orientation compared to the thickness of the thinnest portion of the part when the part is formed in any of the plurality of orientations other than the forming orientation.

In some examples, a computer system for orientating a part for incremental sheet forming thereof includes means for characterizing a shape of the part to be formed from a blank sheet that is parallel to a virtual plane. The means for characterizing may include a processor, in some examples. The computer system also includes means for identifying, relative to the virtual plane, a forming orientation of the part from multiple orientations. The means for identifying may also include a processor. In some examples, the means for characterizing and the means for identifying may include the same processor. The thickness of the thinnest portion of the part is at the maximum when the part is in the forming orientation compared to the thickness of the thinnest portion of the part when the part is formed in any of the plurality of orientations other than the forming orientation.

Provided also is a computer program product that includes a computer usable medium having a computer readable program code embodied therein. The computer readable program code is adapted to be executed to implement a method for orienting a part relative to a virtual plane parallel to a blank sheet, the part to be formed from the blank sheet by incremental sheet forming using a stylus perpendicular to the virtual plane. This method involves characterizing a shape of the part to be formed from a blank sheet that is parallel to a virtual plane and identifying, relative to the virtual plane, a forming orientation of the part from a plurality of orientations. The thickness of the thinnest portion of the part is at the maximum when the part is in the forming orientation compared to the thickness of the thinnest portion of the part when the part is formed in any of the plurality of orientations other than the forming orientation.

Aircraft-Related Examples

Figure 8:
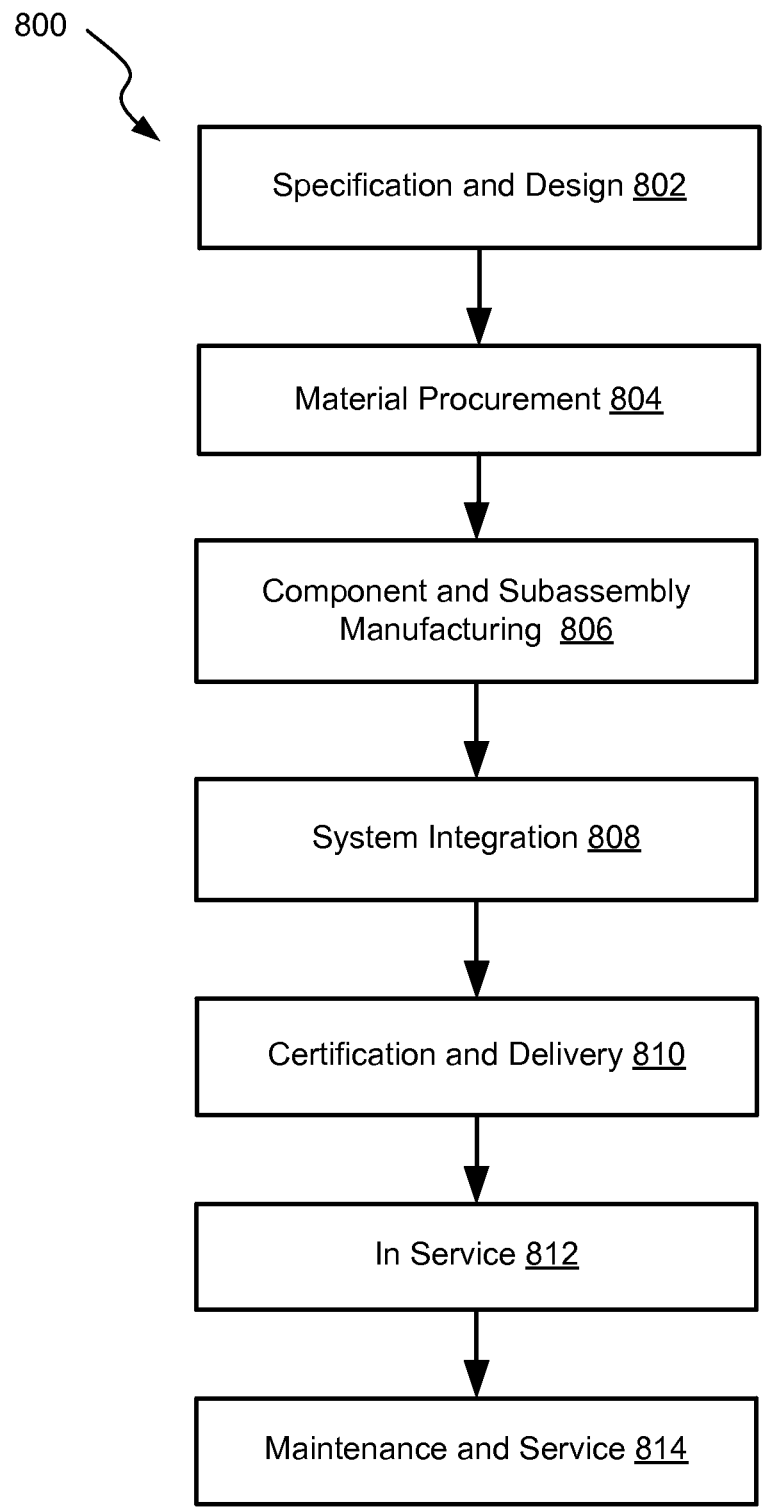
FIG. 8 is a process flowchart reflecting key operations in aircraft manufacturing and service including incremental sheet forming of a part for use on an aircraft, in accordance with one or more aspects of the disclosure.

An aircraft manufacturing and service method 800 shown in FIG. 8 and an aircraft 900 shown in FIG. 9 will now be described to better illustrate various features of processes and systems presented herein. During pre-production, aircraft manufacturing and service method 800 may include specification and design 802 of the aircraft and material procurement 804. The production phase involves component and subassembly manufacturing 806 and system integration 808 of the aircraft. Thereafter, the aircraft may go through certification and delivery 810 in order to be placed in service 812. While in service by a customer, the aircraft is scheduled for routine maintenance and service 814 (which may also include modification, reconfiguration, refurbishment, and so on). While the examples described herein relate generally to servicing of commercial aircraft, they may be practiced at other stages of the aircraft manufacturing and service method 800.

Each of the processes of aircraft manufacturing and service method 800 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 9:
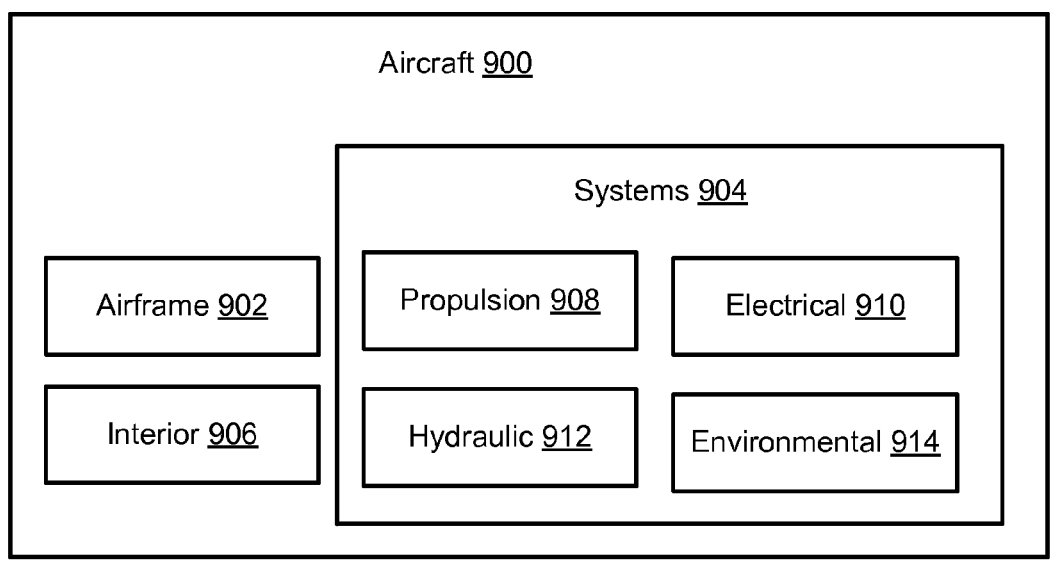
FIG. 9 is a block diagram illustrating various key components of an aircraft, in accordance with one or more aspects of the disclosure.

As shown in FIG. 9, aircraft 900 produced by aircraft manufacturing and service method 800 may include airframe 902, interior 906, and multiple systems 904 and interior 906. Examples of systems 904 include one or more of propulsion system 908, electrical system 910, hydraulic system 912, and environmental system 914. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 800. For example, without limitation, components or subassemblies corresponding to component and subassembly manufacturing 806 may be fabricated or manufactured in a manner similar to components or subassemblies produced while the aircraft is in service.

Also, various features described herein may be utilized during aircraft component and subassembly manufacturing 806 and/or during system integration 808, which may expedite assembly or reduce the cost of the aircraft. In some examples, these features may be utilized while the aircraft is in service, for example, during maintenance and service 814 of the aircraft.

Provided also is an aircraft having a part formed by characterizing a shape of the part to be formed from a blank sheet that is parallel to a virtual plane and identifying, relative to the virtual plane, a forming orientation of the part from multiple orientations. The thickness of the thinnest portion of the part is at the maximum when the part is in the forming orientation compared to the thickness of the thinnest portion of the part when the part is formed in any of the plurality of orientations other than the forming orientation. The part is then formed in this forming orientation.

Provided also is a part for use on an aircraft. The part is formed by characterizing a shape of the part to be formed from a blank sheet that is parallel to a virtual plane and identifying, relative to the virtual plane, a forming orientation of the part from multiple orientations. The thickness of the thinnest portion of the part is at the maximum when the part is in the forming orientation compared to the thickness of the thinnest portion of the part when the part is formed in any of the plurality of orientations other than the forming orientation. The part is then formed in this forming orientation.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A method of orienting a part to be formed from a blank sheet relative to a virtual plane parallel to the blank sheet, the part to be formed from the blank sheet by incremental sheet forming using a stylus perpendicular to the virtual plane, the method comprising:
characterizing a shape of the part; and
identifying, relative to the virtual plane, a forming orientation of the part from a plurality of orientations,
wherein a thickness of a thinnest portion of the part is at a maximum when the part is formed in the forming orientation compared to the thickness of the thinnest portion of the part when the part is formed in any of the plurality of orientations other than the forming orientation, and
wherein identifying the forming orientation comprises:
(i) approximating the shape with surface elements, wherein the shape approximated with the surface elements is in one of the plurality of orientations relative to the virtual plane;
(ii) calculating an actual area of each of the surface elements;
(iii) calculating a projected area of each of the surface elements,
wherein the projected area is a normal projection of each of the surface elements onto the virtual plane;
(iv) identifying, among the surface elements, a specific surface element having a smallest ratio of the projected area to the actual area;
(v) reorienting the shape, approximated with the surface elements, into another one of the plurality of orientations relative to the virtual plane;
(vi) repeating (iii)-(v) for each of the plurality of orientations; and
(vii) selecting from the plurality of orientations, the forming orientation,
wherein the specific surface element, associated with the forming orientation, has a highest value of the smallest ratio of the projected area to the actual area of the specific surface element, associated with any other orientation of the plurality of orientations.

2. The method of claim 1, wherein identifying the forming orientation comprises identifying an angle of rotation of the part relative to an axis in the virtual plane.

3. The method of claim 1, wherein identifying the forming orientation comprises identifying a first angle of rotation of the part relative to a first axis in the virtual plane and identifying a second angle of rotation of the part relative to a second axis in the virtual plane.

4. The method of claim 1, wherein approximating the shape comprises approximating the shape with flat triangular surface elements.

5. The method of claim 1, wherein approximating the shape comprises one of a tessellation or a surface meshing.

6. The method of claim 1, wherein reorienting the shape relative to the virtual plane comprises rotating the shape around an axis in the virtual plane.

7. The method of claim 1, wherein reorienting the shape relative to the virtual plane further comprises rotating the shape around a first axis in the virtual plane and around a second axis in the virtual plane.

8. The method of claim 7, wherein each of the plurality of orientations comprises a first angle of the shape relative to the first axis and a second angle of the shape relative to the second axis.

9. The method of claim 1, wherein reorienting the shape relative to the virtual plane is controlled by a global search algorithm.

10. The method of claim 1, wherein calculating the projected area of each of the surface elements after reorienting the shape approximated with the surface elements into the other one of the plurality of orientations relative to the virtual plane comprises determining coordinates of each of the surface elements for the other one of the plurality of orientations.

11. The method of claim 10, wherein determining the coordinates of the surface elements after reorienting the shape comprises matrix multiplication of the coordinates of the surface elements before reorienting the shape.

12. The method of claim 1, wherein repeating (iii)-(v) for each of the plurality of orientations comprises applying a global search algorithm.

13. The method of claim 1, further comprising calculating a minimum thickness of the part to be formed corresponding to the smallest ratio for each of the plurality of orientations.

14. The method of claim 1, further comprising fabricating a die for positioning the part in the forming orientation during forming of the blank sheet.

15. The method of claim 1, further comprising forming the blank sheet into the part, wherein the part is in the forming orientation.

16. The method of claim 15, wherein forming the blank sheet into the part with the part being in the forming orientation comprises one of two-point incremental forming or single-point incremental forming.

17. The method of claim 1, wherein identifying the forming orientation comprises determining a thickness profile of the part in each of the plurality of orientations and identifying a minimal thickness in the thickness profile of the part in each of the plurality of orientations.

18. A computer system for orienting a part to be formed from a blank sheet relative to a virtual plane parallel to the blank sheet, the part to be formed from the blank sheet by incremental sheet forming using a stylus perpendicular to the virtual plane, the computer system comprising:
   a memory configured to store a characterization of a shape of the part to be formed from the blank sheet; and
   a processor configured to identify, relative to the virtual plane, a forming orientation of the part from a plurality of orientations,
      wherein a thickness of a thinnest portion of the part is at a maximum when the part is formed in the forming orientation compared to the thickness of the thinnest portion of the part when the part is formed in any of the plurality of orientations other than the forming orientation, and
      wherein identifying the forming orientation comprises:
         (i) approximating the shape with surface elements, wherein the shape approximated with the surface elements is in one of the plurality of orientations relative to the virtual plane;
         (ii) calculating an actual area of each of the surface elements;
         (iii) calculating a projected area of each of the surface elements,
            wherein the projected area is a normal projection of each of the surface elements onto the virtual plane;
         (iv) identifying, among the surface elements, a specific surface element having a smallest ratio of the projected area to the actual area;
         (v) reorienting the shape, approximated with the surface elements, into another one of the plurality of orientations relative to the virtual plane;
         (vi) repeating (iii)-(v) for each of the plurality of orientations; and
         (vii) selecting, from the plurality of orientations, the forming orientation,
            wherein the specific surface element, associated with the forming orientation, has a highest value of the smallest ratio of the projected area to the actual area of the specific surface element, associated with any other orientation of the plurality of orientations.

19. A computer system for orienting a part to be formed from a blank sheet relative to a virtual plane parallel to the blank sheet, the part to be formed from the blank sheet by incremental sheet forming using a stylus perpendicular to the virtual plane, the computer system comprising:
   means for characterizing a shape of the part to be formed from a blank sheet that is parallel to a virtual plane; and
   means for identifying, relative to the virtual plane a forming orientation of the part from a plurality of orientations,
      wherein a thickness of a thinnest portion of the part is at a maximum when the part is formed in the forming orientation compared to the thickness of the thinnest portion of the part when the part is formed in any of the plurality of orientations other than the forming orientation, and
      wherein identifying the forming orientation comprises:
         (i) approximating the shape with surface elements, wherein the shape approximated with the surface elements is in one of the plurality of orientations relative to the virtual plane;
         (ii) calculating an actual area of each of the surface elements;
         (iii) calculating a projected area of each of the surface elements,
            wherein the projected area is a normal projection of each of the surface elements onto the virtual plane;
         (iv) identifying, among the surface elements, a specific surface element having a smallest ratio of the projected area to the actual area;
         (v) reorienting the shape, approximated with the surface elements, into another one of the plurality of orientations relative to the virtual plane;
         (vi) repeating (iii)-(v) for each of the plurality of orientations; and
         (vii) selecting, from the plurality of orientations, the forming orientation,
            wherein the specific surface element, associated with the forming orientation, has a highest value of the smallest ratio of the projected area to the actual area of the specific surface element associated with any other orientation of the plurality of orientations.

20. A computer program product, comprising a non-transitory computer usable medium having a computer readable program code embodied therein, said computer readable program code adapted to be executed to implement a method for orienting a part to be formed from a blank sheet relative to a virtual plane parallel to the blank sheet, the part to be formed from the blank sheet by incremental sheet forming using a stylus perpendicular to the virtual plane, the method comprising:
   characterizing a shape of the part to be formed from a blank sheet that is parallel to a virtual plane; and
   identifying, relative to the virtual plane, a forming orientation of the part from a plurality of orientations,
      wherein a thickness of a thinnest portion of the part is at a maximum when the part is formed in the forming orientation compared to the thickness of the thinnest portion of the part when the part is formed in any of the plurality of orientations other than the forming orientation, and
      wherein identifying the forming orientation comprises:
         (i) approximating the shape with surface elements, wherein the shape approximated with the surface elements is in one of the plurality of orientations relative to the virtual plane;

(ii) calculating an actual area of each of the surface elements;
(iii) calculating a projected area of each of the surface elements,
   wherein the projected area is a normal projection of each of the surface elements onto the virtual plane;
(iv) identifying, among the surface elements, a specific surface element having a smallest ratio of the projected area to the actual area;
(v) reorienting the shape, approximated with the surface elements, into another one of the plurality of orientations relative to the virtual plane;
(vi) repeating (iii)-(v) for each of the plurality of orientations; and
(vii) selecting, from the plurality of orientations, the forming orientation,
   wherein the specific surface element, associated with the forming orientation, has a highest value of the smallest ratio of the projected area to the actual area of the specific surface element, associated with any other orientation of the plurality of orientations.

\* \* \* \* \*